(12) United States Patent
Anderson et al.

(10) Patent No.: US 9,189,259 B2
(45) Date of Patent: Nov. 17, 2015

(54) PROVISIONING OF VIRTUAL MACHINE POOLS BASED ON HISTORICAL DATA IN A NETWORKED COMPUTING ENVIRONMENT

(75) Inventors: Jason L. Anderson, San Jose, CA (US); Gregory J. Boss, Saginaw, MI (US); Jeffery L. Coveyduc, San Jose, CA (US); Christopher W. Roach, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 13/214,454

(22) Filed: Aug. 22, 2011

(65) Prior Publication Data

US 2013/0055239 A1 Feb. 28, 2013

(51) Int. Cl.
G06F 9/455 (2006.01)
G06F 9/46 (2006.01)
G06F 9/445 (2006.01)

(52) U.S. Cl.
CPC *G06F 9/455* (2013.01); *G06F 8/61* (2013.01); *G06F 9/45533* (2013.01)

(58) Field of Classification Search
None
See application file for complete search history.

(56) References Cited

U.S. PATENT DOCUMENTS

| | | | |
|---|---|---|---|
| 5,093,912 A | 3/1992 | Dong et al. | |
| 7,516,457 B2 | 4/2009 | Eilam et al. | |
| 7,577,722 B1 | 8/2009 | Khandekar et al. | |
| 7,809,831 B2 | 10/2010 | Matsumitsu et al. | |
| 2002/0165892 A1* | 11/2002 | Grumann et al. | 709/100 |
| 2006/0159014 A1 | 7/2006 | Breiter et al. | |
| 2006/0167984 A1* | 7/2006 | Fellenstein et al. | 709/203 |
| 2006/0225079 A1* | 10/2006 | Nayak et al. | 718/105 |
| 2007/0214455 A1 | 9/2007 | Williams et al. | |
| 2008/0059972 A1* | 3/2008 | Ding et al. | 718/105 |
| 2008/0201711 A1* | 8/2008 | Amir Husain | 718/1 |
| 2008/0263553 A1* | 10/2008 | Lueck et al. | 718/102 |
| 2009/0276771 A1 | 11/2009 | Nickolov et al. | |
| 2010/0199285 A1* | 8/2010 | Medovich | 718/104 |
| 2010/0269109 A1* | 10/2010 | Cartales | 718/1 |
| 2010/0274890 A1* | 10/2010 | Patel et al. | 709/224 |
| 2010/0325191 A1* | 12/2010 | Jung et al. | 709/202 |
| 2011/0138047 A1 | 6/2011 | Brown et al. | |
| 2011/0202925 A1* | 8/2011 | Banerjee et al. | 718/104 |

OTHER PUBLICATIONS

Ravid, Practical Statistics for Educators, Oct. 2010, Rowman & Littlefield Publishers, Inc., p. 101.*

(Continued)

*Primary Examiner* — Lewis A Bullock, Jr.
*Assistant Examiner* — Melissa Alfred
(74) *Attorney, Agent, or Firm* — William E. Schiesser; Keohane & D'Alessandro PLLC; Hunter E. Webb (57) ABSTRACT

Embodiments of the present invention generally describe how to utilize a pool of raw computing resources to dynamically resize environments due to workloads. Specifically, embodiments of the invention provide an approach for generating a partially pre-provisioned pool of virtual machines (VMs). The pool is typically derived from a history of patterns weighted by a potential state of a corresponding VM image to fulfill a workload request. For each VM instance, this approach determines/calculates the number of times that an instance represents a possible starting point for a VM request. The starting points are then normalized to create a probability distribution of the resulting partially pre-provisioned pool of virtual machines.

22 Claims, 8 Drawing Sheets

(56) References Cited

OTHER PUBLICATIONS

Xu et al., Multi-objective Virtual Machine Placement in Virtualized Data Center Environments, Dec. 2010, IEE Computer Society, Proceedings of the 2010 IEEE/ACM Int'l Conference on Green Computing Communications \& Int'l Conference on Cyber, Physical and Social Computing, pp. 179-188.*

Zhu, J. et al, "Twinkle: A Fast Resource Provisioning Mechanism for Internet Services", Zhenxiao.com, pp. 1-9. No. publication date cited.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Zhu, J. et al, "Twinkle: A Fast Resource Provisioning Mechanism for Internet Services", Zhenxiao.com, INFOCOM 2011, pp. 1-9.

Maitland, J., "Keeping Control Isn't Easy", Chapter 4: Cloud-Based Infrastructure, SearchCloudComputing.com, Publication Date: Oct. 2009, 17 pages.

* cited by examiner

| SOFTWARE INSTALLABLE CONTAINED | % PROVISIONED INSTANCES WHICH CONTAINED |
|---|---|
| P(A □ i) | 50% |
| P(B □ x) | 80% |
| P(A □ i ∩ B □ x) | 30% |

PROVISIONING OF VIRTUAL MACHINE POOLS BASED ON HISTORICAL DATA IN A NETWORKED COMPUTING ENVIRONMENT

TECHNICAL FIELD

In general, the present invention relates to the provisioning of virtual machines (VMs) in a networked computing environment (e.g., a cloud computing environment). Specifically, the present invention relates to provisioning of pools of VMs based on historical data.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Cloud computing services are typically rendered within a relatively static hardware pool whereby operating systems and applications are deployed and reconfigured to meet the computational demands of consumers. Within the cloud environment's boundaries, application images can be installed and overwritten, Internet Protocol (IP) addresses may be modified, and real and virtual processors may be allocated to meet changing business needs. Presently, different cloud service providers may take varying amounts of time to provision virtual machines requested by consumers. For example, some cloud providers may provision a particular resource in a matter of seconds, while others may take hours. The differences in provisioning speeds are generally caused by at least three factors: the type of storage architecture, the architecture of the cloud management platform, and/or the methods used to provision resources. As such, challenges can exist in providing consistent and reliable computing resource provisioning times.

SUMMARY

Embodiments of the present invention generally describe how to utilize a pool of raw computing resources to dynamically resize environments due to workloads. Specifically, embodiments of the invention provide an approach for generating a partially pre-provisioned pool of virtual machines (VMs). The pool is typically derived from a history of patterns weighted by a potential state of a corresponding VM image to fulfill a workload request. For each VM instance, this approach determines/calculates the number of times that an instance represents a possible starting point for a VM request. The starting points are then normalized to create a probability distribution of the resulting partially pre-provisioned pool of virtual machines.

A first aspect of the present invention provides a computer-implemented method for provisioning a pool of virtual machines (VMs) in a networked computing environment, comprising: accessing, in at least one computer data structure, a history of previously provisioned VMs in the networked computing environment; determining, based on the history, raw percentages of the previously provisioned VMs that comprised a particular set of software programs; transforming each of the raw percentages to yield normalized percentages; and provisioning a pool of VMs having the particular set of software programs in the networked computing environment based on the normalized percentages.

A second aspect of the present invention provides a system for provisioning a pool of virtual machines (VMs) in a networked computing environment, comprising: a memory medium comprising instructions; a bus coupled to the memory medium; and a processor coupled to the bus that when executing the instructions causes the system to: access, in at least one computer data structure, a history of previously provisioned VMs in the networked computing environment; determine, based on the history, raw percentages of the previously provisioned VMs that comprised a particular set of software programs; transform each of the raw percentages to yield normalized percentages; and provision a pool of VMs having the particular set of software programs in the networked computing environment based on the normalized percentages.

A third aspect of the present invention provides a computer program product for provisioning a pool of virtual machines (VMs) in a networked computing environment, the computer program product comprising a computer readable storage media, and program instructions stored on the computer readable storage media, to: access, in at least one computer data structure, a history of previously provisioned VMs in the networked computing environment; determine, based on the history, raw percentages of the previously provisioned VMs that comprised a particular set of software programs; transform each of the raw percentages to yield normalized percentages; and provision a pool of VMs having the particular set of software programs in the networked computing environment based on the normalized percentages.

A fourth aspect of the present invention provides a method for deploying a system for provisioning a pool of virtual machines (VMs) in a networked computing environment, comprising: providing a computer infrastructure being operable to: access, in at least one computer data structure, a history of previously provisioned VMs in the networked computing environment; determine, based on the history, raw percentages of the previously provisioned VMs that comprised a particular set of software programs; transform each of the raw percentages to yield normalized percentages; and provision a pool of VMs having the particular set of software programs in the networked computing environment based on the normalized percentages.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention generally describe how to utilize a pool of raw computing resources to dynamically resize environments due to workloads. Specifically, embodiments of the invention provide an approach for generating a partially pre-provisioned pool of virtual machines (VMs). The pool is typically derived from a history of patterns weighted by a potential state of a corresponding VM image to fulfill a workload request. For each VM instance, this approach determines/calculates the number of times that an instance represents a possible starting point for a VM request. The starting points are then normalized to create a probability distribution of the resulting partially pre-provisioned pool of virtual machines.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
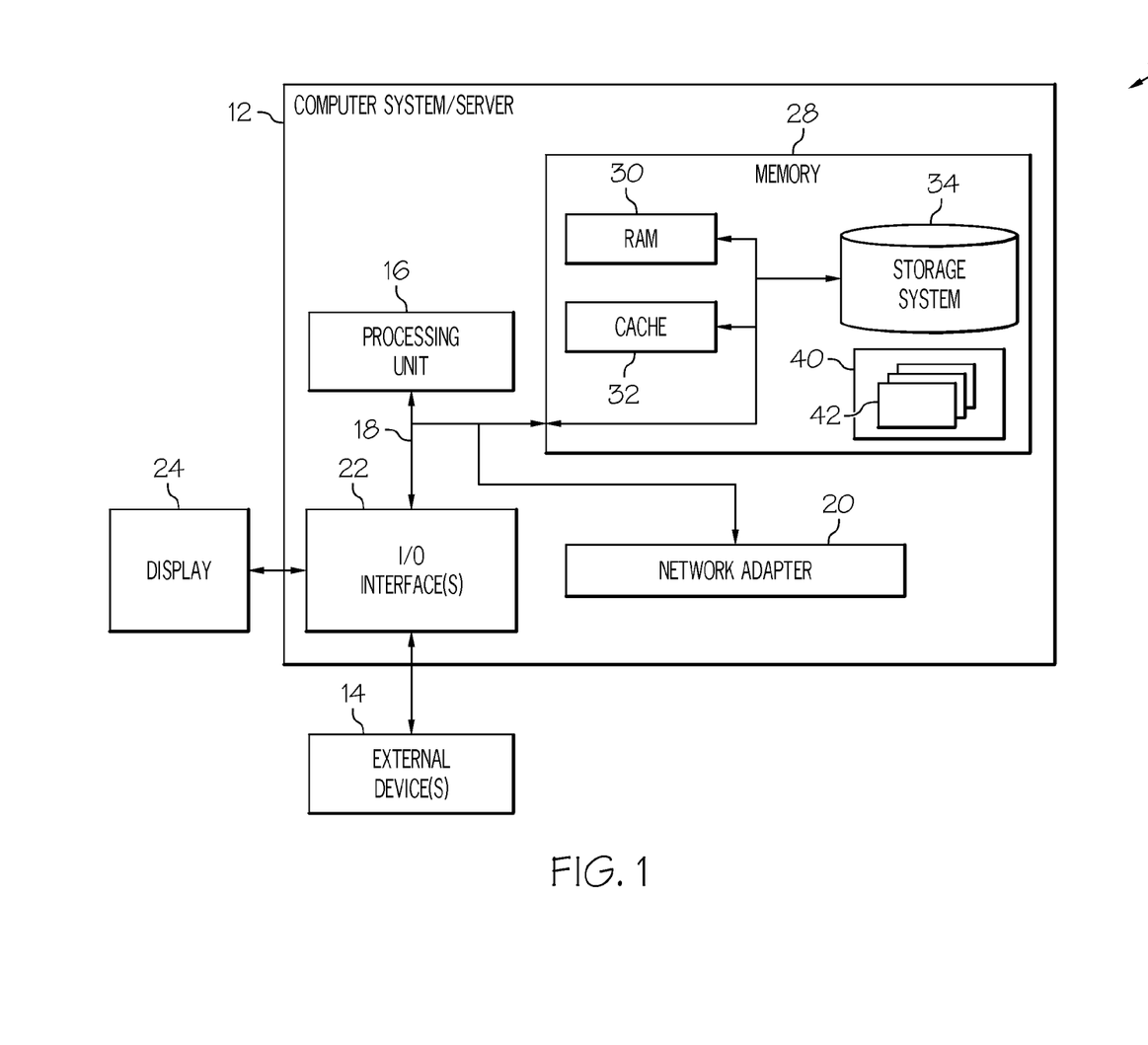
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
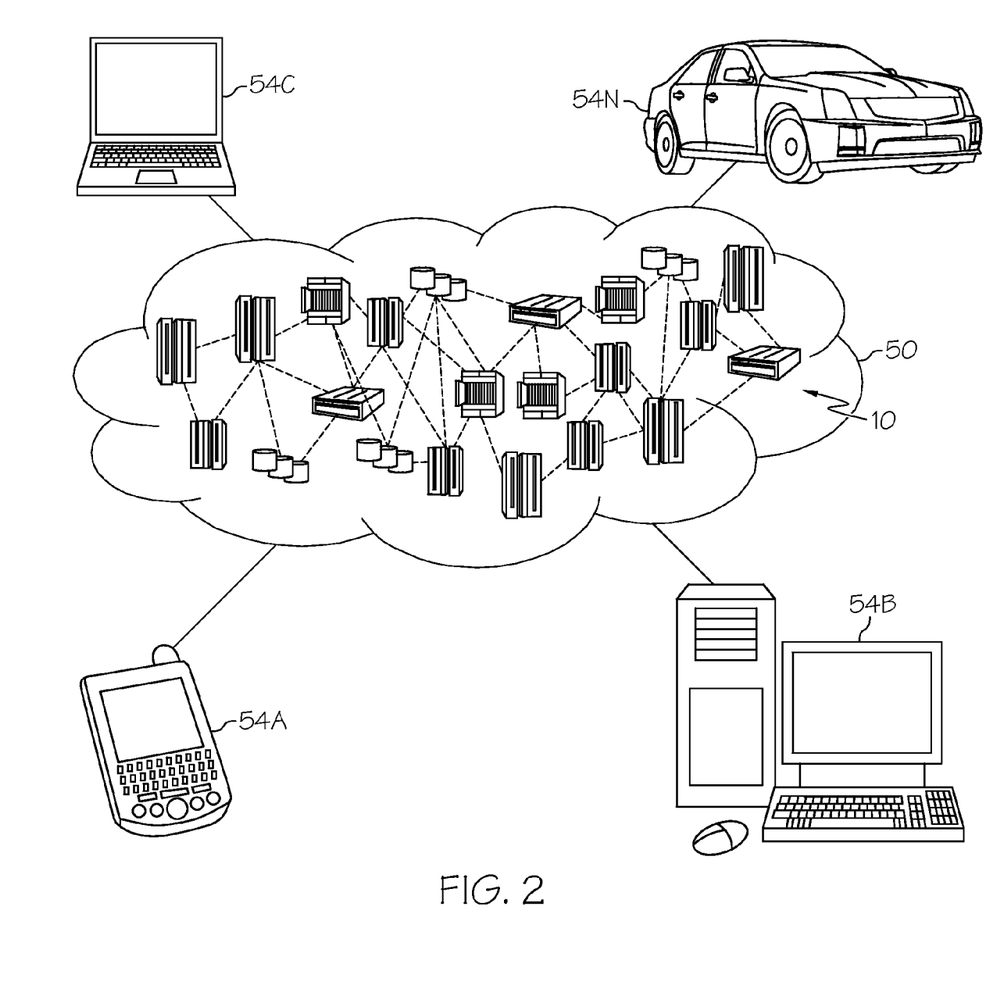
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
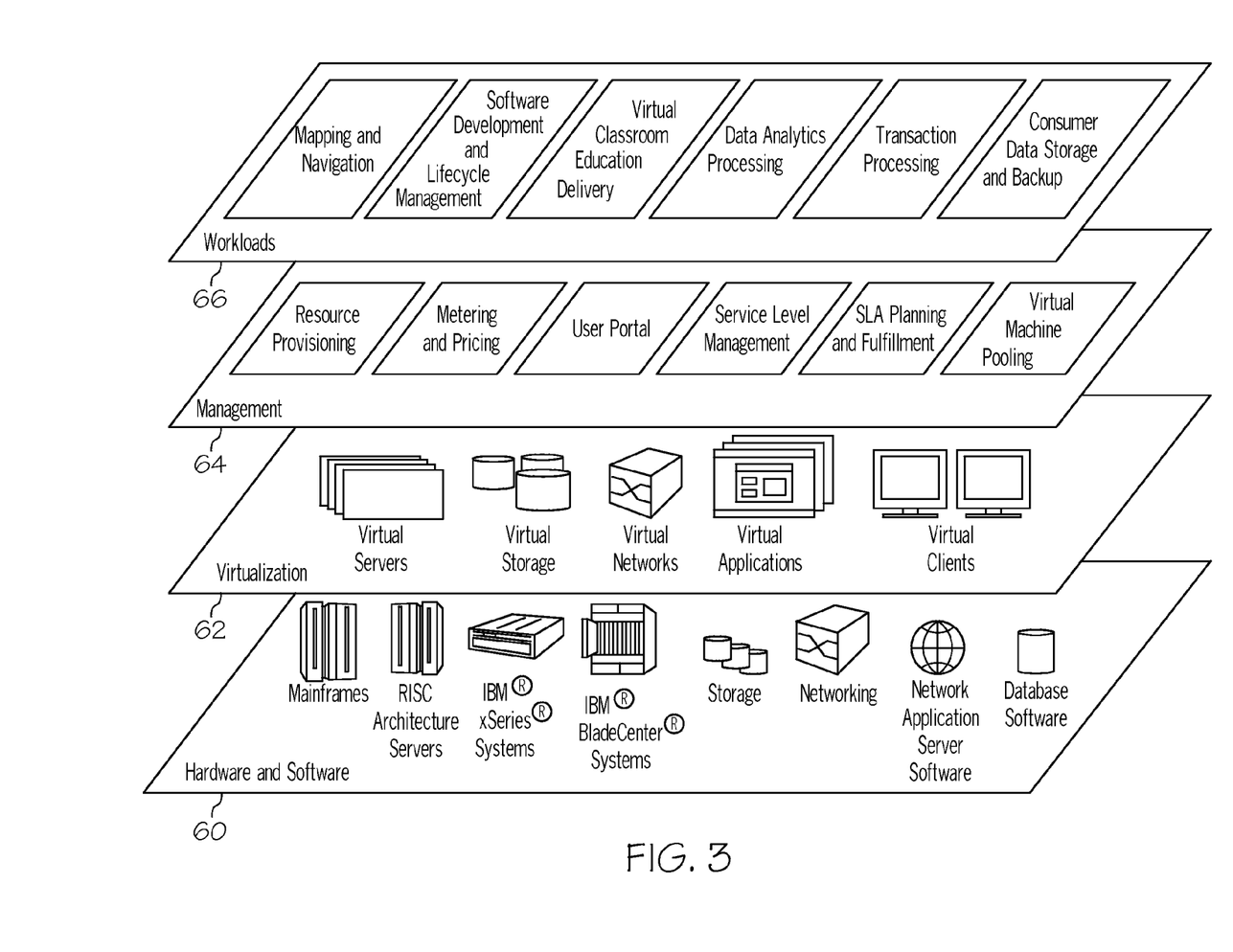
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual machine pooling function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the virtual machine pooling functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
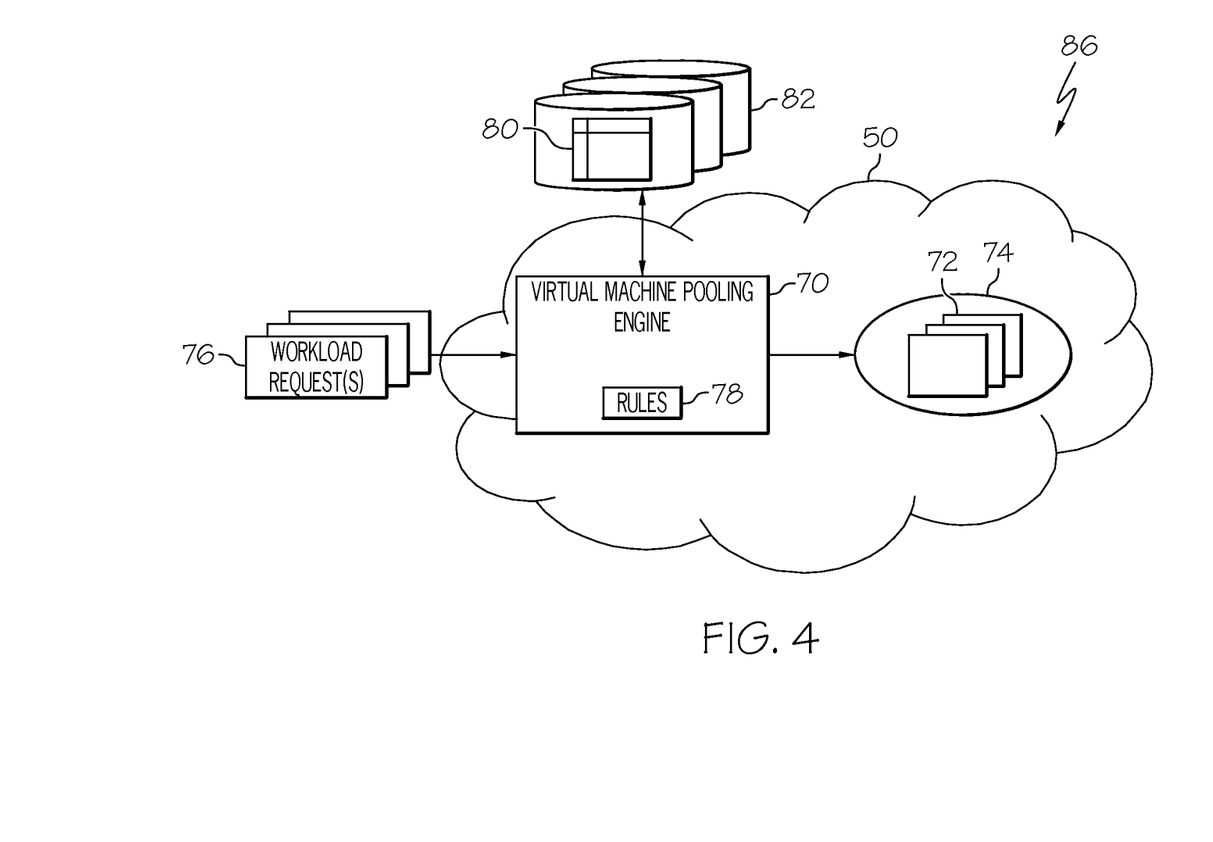
FIG. 4 depicts a system diagram according to an embodiment of the present invention.

Referring now to FIG. 4, a system diagram according to an aspect of the present invention is shown. As depicted, a virtual machine pooling engine (engine 70) is shown. In general, engine 70 can be implemented as program 40 on computer system 12 of FIG. 1 and can implement the functions recited herein as depicted in management layer 64 of FIG. 3. In general, engine 70 comprises (in one example) a rules engine that processes a set (at least one) of rules 78 and utilizes historical data 80 (stored on a set of computer data structures 82) to provision a pool 74 of VMs 72 in networked computing environment 86 (e.g., cloud computing environment 50) to handle one or more workload requests 76.

Along these lines, engine 70 may perform multiple functions using rules 78. Specifically, among other functions, engine 70 may: access, in at least one computer data structure 82, a history 80 of previously provisioned VMs in networked computing environment 86; determine, based on history 80, raw percentages of the previously provisioned VMs that comprised a particular set of software programs; adjust each of the percentages to yield normalized percentages; and provision a pool 74 of VMs 72 having the particular set of software programs in networked computing environment 86 based on the normalized percentages.

Figure 5:
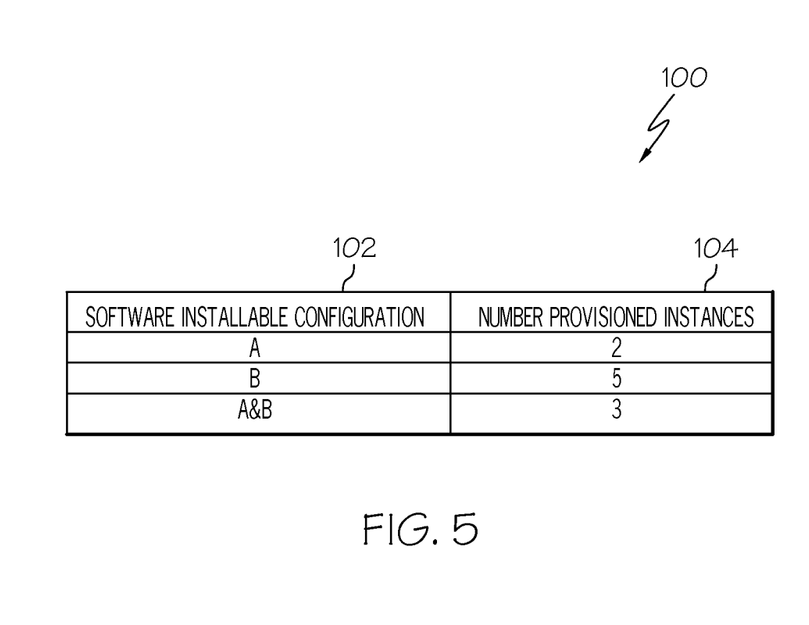
FIG. 5 depicts a first table according to an embodiment of the present invention.

Along these lines, rules 78 enable engine 70 to calculate a number of times that an instance represents a possible starting point for a VM request; and/or normalizes percentage to create a probability distribution of the resulting partially pre-provisioned pool of VMs. To better explain the calculation of the number of times that an instance represents a possible starting point for a VM request, reference is now made to FIG. 5 (which shows illustrative historical data. As depicted, table 100 comprises columns 102 and 104 that correspond to software installable configurations and numbers of provisioned VM instances, respectively. Specifically, two different software installables/programs are shown (A and B), in three different combinations in column 102: "A" only, "B" only, and "A & B". As further shown, A only appeared in two provisioned instances, B only appeared in five provisioned VM instances, and "A & B" appeared in three provisioned VM instances (for a total of 10 provisioned instances)

Figure 6:
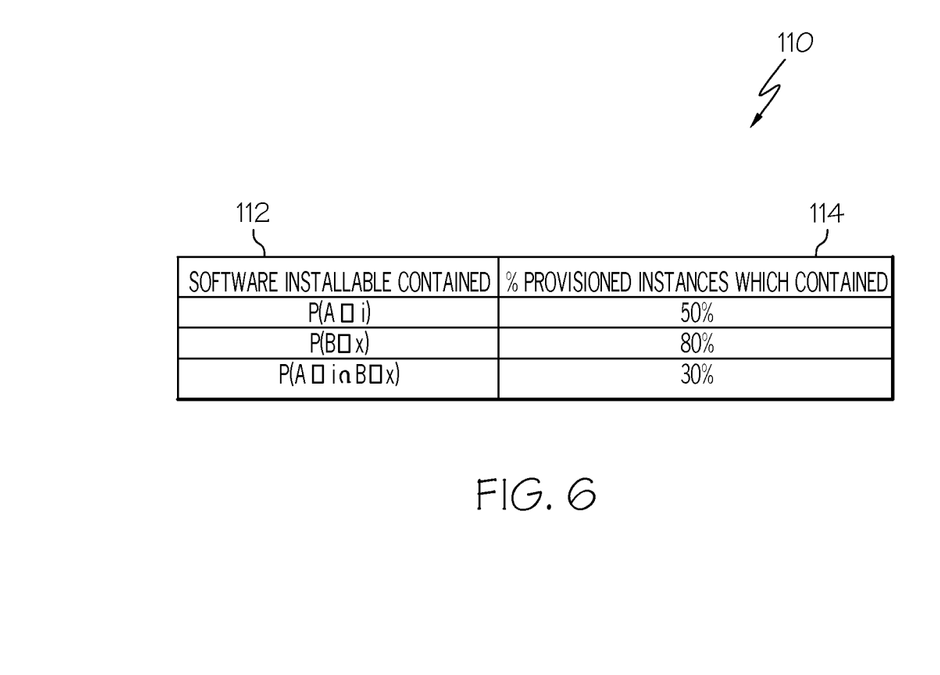
FIG. 6 depicts a second table according to an embodiment of the present invention.

Based on this data, the table 110 of FIG. 6 is yielded having a column 112 for each software installable/grouping and a column 114 containing the associated raw percentages that the corresponding software combination in column 112 represented the total number of provisioned instances. As shown, software program "A" only was present in 5/10 or 50% of provisioned VM instances; software program "B" only was present in 8/10 or 80% of the provisioned VM instances; and combination "A & B" was present in 3/10 or 30% of the provisioned VM instances.

Figure 7:
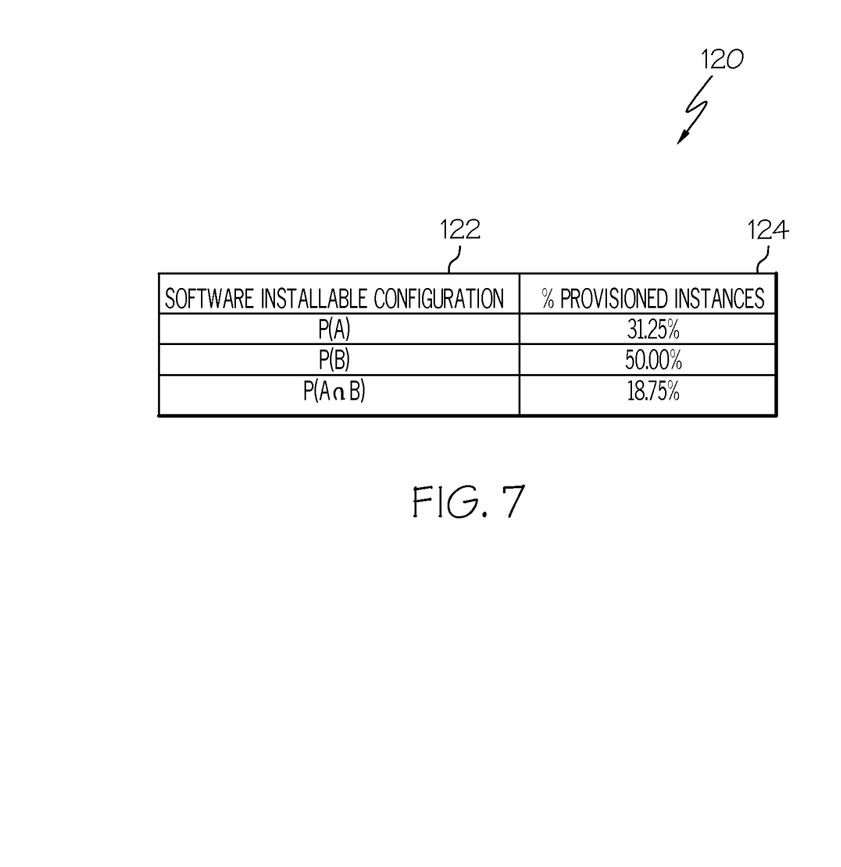
FIG. 7 depicts a third table according to an embodiment of the present invention.

Referring to FIG. 7, the raw percentages are adjusted/normalized in table 120. Specifically, table 120 comprises a column 122 for each software installable/grouping and a column 124 containing the associated normalized percentages that the corresponding software combination in column 122 represented the total number of provisioned instances. Normalization occurs by summing the raw percentages in column 114 of table 110 (FIG. 6) to yield a normalization factor, and then by dividing each individual raw percentage in column 114 by the normalization factor. Specifically, the raw percentages in column 114 were 50%+80%+30% to yield a total percentage/normalization factor. Therefore, as shown in FIG. 7, the normalized percentage for software program "A" only is 50/160 or 31.25%; the normalized percentage for software "B" only is 80/160 or 50%; and the normalized percentage for software programs "A & B" is 30/160 or 18.75%.

These resulting normalized percentages are then used by engine 70 (FIG. 4) to provision pool 74 of VMs 72, which reduces the average wait time for cloud consumers. Workload requests 76 can then be received and processed using pool 74 of VMs 72. The following is an algorithm according to an embodiment of the present invention.

| Algorithm: |
| --- |
| 1. totals=int[ ] |
| 2. for each vm instance v do: |
| 3:     for i=1 to numSoftwareInstallables do: |
| 4:         If v.contains($S_i$) then: |
| 5:             totals[i]++ |
| 6. totalProbabilities=float[ ] |
| 7. for i=1 to numSoftwareInstallables do: |
| 8:     totalProbabilites[i]=total[i]/sum(total) |
| 9. selectVMPoolBasedOnDistribution(totalProbabilites) |

Figure 8:
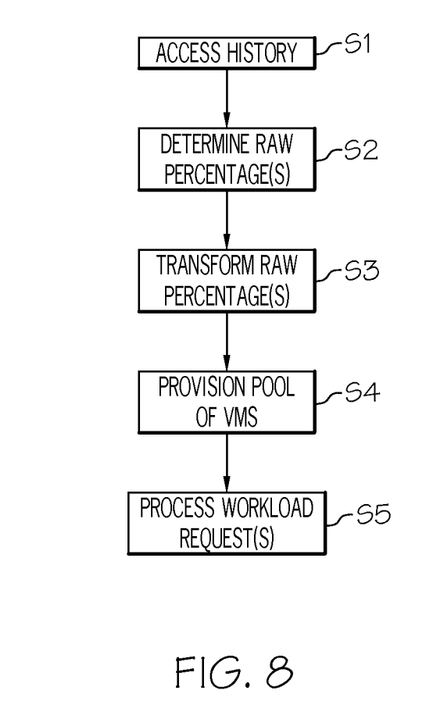
FIG. 8 depicts a method flow diagram according to an embodiment of the present invention.

Referring now to FIG. 8, a method flow diagram according to an embodiment of the present invention is shown. As depicted, in step S1, a history of previously provisioned VMs in the networked computing environment is accessed. In step S2, raw percentages of the previously provisioned VMs that comprised a particular set of software programs are determined based on this history. In step S3, each of the percentages is transformed/adjusted to yield normalized percentages. In step S4, a pool of VMs having the particular set of software programs is provisioned in the networked computing environment based on the normalized percentages. In step S5, workload(s) requested can be processed using the pool of VMs.

While shown and described herein as a VM pooling solution, it is understood that the invention further provides various alternative embodiments. For example, in one embodiment, the invention provides a computer-readable/useable medium that includes computer program code to enable a computer infrastructure to provide VM pooling functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide VM pooling functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for VM pooling. In this case, a computer infrastructure, such as computer system 12 (FIG. 1), can be provided, and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for provisioning a pool of virtual machines (VMs) in a networked computing environment, comprising:
    accessing, in at least one computer data structure, a history of previously provisioned VMs in the networked computing environment, the history including, for each individual software program and each combination of individual software programs, a number of times included in the previously provisioned VMs;
    determining, based on the history, raw percentages of the previously provisioned VMs that comprised a particular set of software programs, the raw percentages indicating a percentage of VMs that comprised each individual software program and each combination of individual software programs;
    transforming each of the raw percentages to yield normalized percentages, wherein a sum of all of the normalized percentages is one-hundred percent;
    creating a probability distribution corresponding with the previously provisioned VMs that comprised the particular set of software programs from the normalized percentages; and
    provisioning a pool of VMs having the particular set of software programs, in the networked computing environment, based on the probability distribution such that the set of software programs are provisioned prior to being requested for use by a particular VM, wherein the pool of VMs is distributed across a plurality of physical devices in the networked computing environment.

2. The computer-implemented method of claim 1, the transforming comprising:
    summing the raw percentages to yield a total percentage; and
    dividing each of the raw percentages by the total percentage to yield a normalized percentage for each of the VM instances.

3. The computer-implemented method of claim 1, further comprising determining quantities of the previously provisioned VMs that comprised the particular set of software programs, the raw percentages being based on the quantities.

4. The computer-implemented method of claim 1, the networked computing environment comprising a cloud computing environment.

5. The computer-implemented method of claim 1, the pool comprising the VMs according to the normalized percentages.

6. The computer-implemented method of claim 1, further comprising receiving a workload request in the networked computing environment.

7. The computer-implemented method of claim 6, further comprising processing the request using at least one of the VMs from the pool of VMs.

8. A system for provisioning a pool of virtual machines (VMs) in a networked computing environment, comprising:
    a memory medium comprising instructions;
    a bus coupled to the memory medium; and
    a processor coupled to the bus that when executing the instructions causes the system to:
        access, in at least one computer data structure, a history of previously provisioned VMs in the networked computing environment, the history including, for each individual software program and each combination of individual software programs, a number of times included in the previously provisioned VMs;
        determine, based on the history, raw percentages of the previously provisioned VMs that comprised a particular set of software programs, the raw percentages indicating a percentage of VMs that comprised each individual software program and each combination of individual software programs;
        transform each of the raw percentages to yield normalized percentages, wherein a sum of all of the normalized percentages is one-hundred percent;
        create a probability distribution corresponding with the previously provisioned VMs that comprised the particular set of software programs from the normalized percentages; and
        provision a pool of VMs having the particular set of software programs, in the networked computing environment, based on the probability distribution such that the set of software programs are provisioned prior to being requested for use by a particular VM, wherein the pool of VMs is distributed across a plurality of physical devices in the networked computing environment.

9. The system of claim 8, the memory medium further comprising instructions for causing the system to:
    sum the raw percentages to yield a total percentage; and
    divide each of the raw percentages by the total percentage to yield a normalized percentage for each of the VM instances.

10. The system of claim 8, the memory medium further comprising instructions for causing the system to determine quantities of the previously provisioned VMs that comprised the particular set of software programs, the raw percentages being based on the quantities.

11. The system of claim 8, the networked computing environment comprising a cloud computing environment.

12. The system of claim 8, the pool comprising the VMs according to the normalized percentages.

13. The system of claim 8, the memory medium further comprising instructions for causing the system to receive a workload request in the networked computing environment.

14. The system of claim 13, the memory medium further comprising instructions for causing the system to process the request using at least one of the VMs from the pool of VMs.

15. A computer program product for provisioning a pool of virtual machines (VMs) in a networked computing environment, the computer program product comprising a computer readable storage device, the computer readable storage device not being a propagation signal, and program instructions stored on the computer readable storage device, to:
    access, in at least one computer data structure, a history of previously provisioned VMs in the networked computing environment, the history including, for each individual software program and each combination of individual software programs, a number of times included in the previously provisioned VMs;

determine, based on the history, raw percentages of the previously provisioned VMs that comprised a particular set of software programs, the raw percentages indicating a percentage of VMs that comprised each individual software program and each combination of individual software programs;

transform each of the raw percentages to yield normalized percentages, wherein a sum of all of the normalized percentages is one-hundred percent;

create a probability distribution corresponding with the previously provisioned VMs that comprised the particular set of software programs from the normalized percentages; and provision a pool of VMs having a particular set of software programs, in the networked computing environment, based on the probability distribution such that the set of software programs are provisioned prior to being requested for use by a particular VM, wherein the pool of VMs is distributed across a plurality of physical devices in the networked computing environment.

16. The computer program product of claim 15, the computer readable storage device further comprising instructions to:

sum the raw percentages to yield a total percentage; and
divide each of the raw percentages by the total percentage to yield a normalized percentage for each of the VM instances.

17. The computer program product of claim 15, the computer readable storage device further comprising instructions to determine quantities of the previously provisioned VMs that comprise the particular set of software programs, the raw percentages being based on the quantities.

18. The computer program product of claim 15, the networked computing environment comprising a cloud computing environment.

19. The computer program product of claim 15, the pool comprising the VMs according to the normalized percentages.

20. The computer program product of claim 15, the computer readable storage device further comprising instructions to receive a workload request in the networked computing environment.

21. The computer program product of claim 20, the computer readable storage device further comprising instructions to process the request using at least one of the VMs from the pool of VMs.

22. A method for deploying a system for provisioning a pool of virtual machines (VMs) in a networked computing environment, comprising:

providing a computer infrastructure being operable to:
access, in at least one computer data structure, a history of previously provisioned VMs in the networked computing environment, the history including, for each individual software program and each combination of individual software programs, a number of times included in the previously provisioned VMs;

determine, based on the history, raw percentages of the previously provisioned VMs that comprised a particular set of software programs, the raw percentages indicating a percentage of VMs that comprised each individual software program and each combination of individual software programs;

transform each of the percentages to yield normalized percentages, wherein a sum of all of the normalized percentages is one-hundred percent;

create a probability distribution corresponding with the previously provisioned VMs that comprised the particular set of software programs from the normalized percentages; and provision a pool of VMs having the particular set of software programs, in the networked computing environment, based on the probability distribution such that the set of software programs are provisioned prior to being requested for use by a particular VM, wherein the pool of VMs is distributed across a plurality of physical devices in the networked computing environment.

* * * * *